(12) United States Patent
Sagan

(10) Patent No.: US 7,012,766 B2
(45) Date of Patent: Mar. 14, 2006

(54) IMAGING SYSTEM AND METHOD EMPLOYING OFF-AXIS ILLUMINATION OF AN ILLUMINATION MODULATOR

(75) Inventor: Stephen F. Sagan, Lexington, MA (US)

(73) Assignee: AGfa Corporation, Wilmington, MA (US)

( * ) Notice: Subject to any disclaimer, the term of this patent is extended or adjusted under 35 U.S.C. 154(b) by 43 days.

(21) Appl. No.: 10/868,528

(22) Filed: Jun. 15, 2004

(65) Prior Publication Data

US 2005/0275957 A1 Dec. 15, 2005

(51) Int. Cl.
*G02F 1/153* (2006.01)
*G02B 27/10* (2006.01)

(52) U.S. Cl. .................... 359/800; 359/629; 359/625; 359/267

(58) Field of Classification Search ............... 359/800, 359/625, 626, 237, 263, 267, 290, 291
See application file for complete search history.

(56) References Cited

U.S. PATENT DOCUMENTS 6,433,934 B1    8/2002    Reznichenko et al. ...... 359/622

*Primary Examiner*—Timothy Thompson
(74) *Attorney, Agent, or Firm*—Robert A. Sabourin

(57) ABSTRACT

An imaging system includes a first off-axis illumination source for providing a first illumination field at a surface of an illumination modulator such that when the modulator is in a first non-activated mode a zero-order reflected illumination field is directed toward a first illumination blocking device, and when the modulator is in a second activated mode one first order reflected illumination field is directed toward an imaging surface while another first order reflected illumination field is directed toward a second illumination blocking device.

9 Claims, 7 Drawing Sheets

IMAGING SYSTEM AND METHOD EMPLOYING OFF-AXIS ILLUMINATION OF AN ILLUMINATION MODULATOR

BACKGROUND OF THE INVENTION

The invention generally relates to imaging systems, and relates in particular to imaging systems that employ an illumination modulator.

Imaging systems such as those disclosed in U.S. Pat. No. 6,433,934, may include an illumination source, a field lens system, an illumination modulator, imaging optics and an imaging surface. During imaging, the field lens system directs the illumination field onto the light modulator and the light modulator reflects the illumination field toward the imaging surface in one mode and reflects the illumination field away from the imaging surface in another mode. The modulator may, for example, include a Grating Light Valve (GLV) as sold by Silicon Light Machines of Sunnyvale, Calif., and the system may direct, via the imaging optics, either the zero order reflection or the first order reflection toward the imaging surface in various embodiments.

In particular, the image may be recorded from the zero order reflection 10 of the illumination field 12 from the modulator 14 at the imaging surface 16 as shown in FIG. 1A during imaging. As shown in FIG. 1B, when the modulator 14 is activated, the illumination field 12 is reflected at first order reflections 18A and 18B, and to a lesser extent at further order reflections (not shown). The first order reflections 18A and 18B are blocked from reaching the imaging surface 16 by energy absorbing blocking filters 20A and 20B. Imaging occurs, therefore, when the modulator 14 is not activated as shown in FIG. 1A. Ideally, no illumination should be directed along the path of the zero order reflection when the modulator 14 is activated as shown in FIG. 1B. In practice, however, it may be difficult to completely remove illumination from the zero order direction. The illumination field 12 and reflected fields 10, 18A and 18B may also be coplanar as long as the source is protected from the reflected signal, for example by using a directional blocking filter and a beam splitter.

Another conventional imaging system may employ an energy absorbing block filter 22 in the zero order direction 10 as shown in FIG. 2A, and a lens 24 to direct the first order reflections 18A and 18B toward the imaging surface 16 as shown in FIG. 2B. Such an imaging system, however, requires very precise alignment of the components to ensure that the first order reflections 18A and 18B converge at a common focal point at the imaging surface 16. Any misalignment of these components may significantly reduce image quality. Further, off-axis imaging limits the available depth of focus in the imaging system.

Also, many imaging systems employ an illumination field that is generally in the shape of a line of illumination, permitting a line of picture elements (or pixels) to be imaged simultaneously. The illumination fields 10, 12, 18A and 18B may, therefore, be in the shape of a line that extends a short distance along the modulator 14 and along the imaging surface 16 respectively. The use of an illumination field in the shape of a line may further complicate certain of the off-axis imaging constraints.

In certain applications it is desirable to provide an imaging system having a high contrast ratio that does not image when the power is not applied to the modulator, yet does not require highly precise alignment of numerous components and may be readily adjusted to optimum image quality.

SUMMARY OF THE INVENTION

The invention provides an imaging system that includes a first off-axis illumination source for providing an first illumination field at a surface of an illumination modulator such that when the modulator is in a first non-activated mode a zero-order reflected illumination field is directed toward a first illumination blocking device, and when the modulator is in a second activated mode one first order reflected illumination field is directed toward an imaging surface while another first order reflected illumination field is directed toward a second illumination blocking device in accordance with an embodiment.

The imaging system may further include a second off-axis illumination source for providing a second illumination field at a surface of the illumination modulator such that when the modulator is in the first non-activated mode a zero-order second reflected illumination field is directed toward a second illumination blocking device, and when the modulator is in the second activated mode a first order second reflected illumination field is directed toward the imaging surface in accordance with a further embodiment of the invention.

BRIEF DESCRIPTION OF THE DRAWINGS

The following description may be further understood with reference to the accompanying drawings in which.

The drawings are shown for illustrative purposes only and are not to scale.

DETAILED DESCRIPTION OF THE PREFERRED EMBODIMENTS

Systems of the invention may be used in a variety of imaging systems such as, for example, thermal imaging systems that include an illumination field, an illumination modulator and an imaging surface (e.g., an external imaging drum). The modulator receives the illumination field via a field lens system and directs a modulated illumination field toward the imaging surface via imaging optics. The illumination source, field lens system, modulator, imaging optics and imaging surface may be as disclosed in U.S. Pat. No. 6,433,934, the disclosure of which is hereby incorporated by reference. The modulator may include a Grating Light Valve (GLV) as sold by Silicon Light Machines of Sunnyvale, Calif.

Figure 1A:
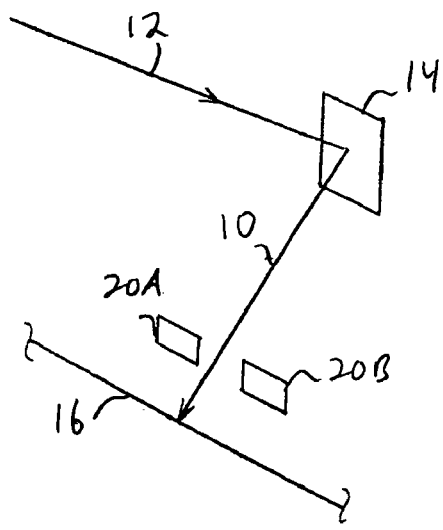
FIGS. 1A and 1B show illustrative diagrammatic views of a prior art imaging system.
Figure 1B:
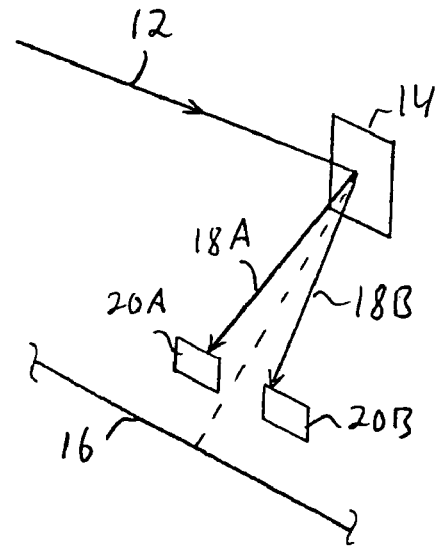
Figure 2A:
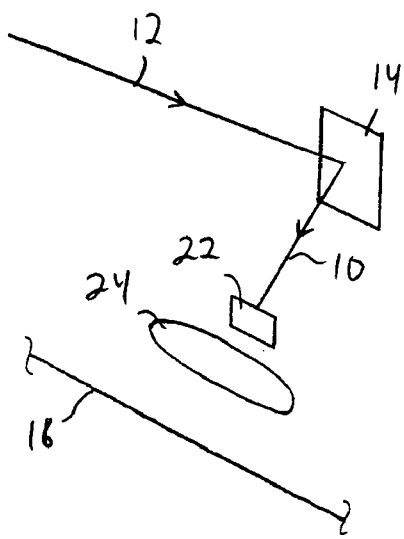
FIGS. 2A and 2B show illustrative diagrammatic views of another prior art imaging system.
Figure 2B:
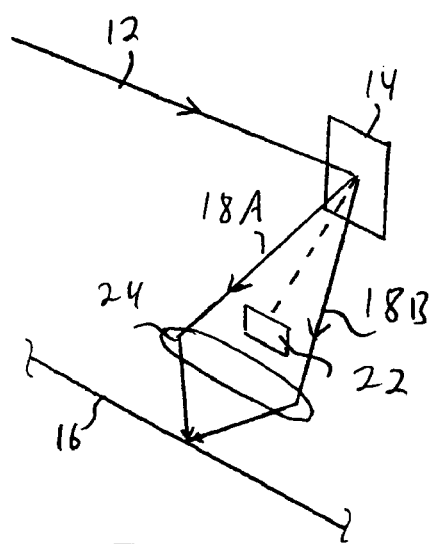
Figure 3A:
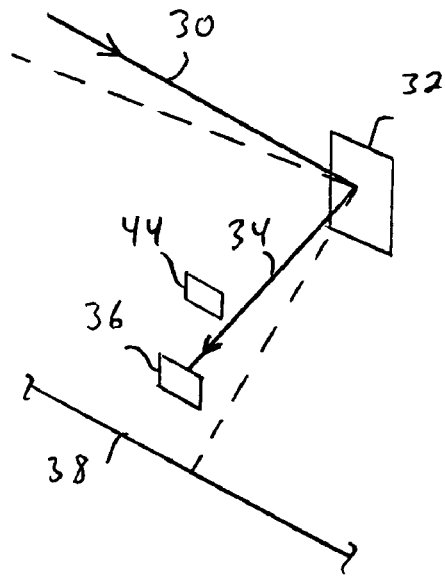
FIGS. 3A and 3B show illustrative diagrammatic views of an imaging system in accordance with an embodiment of the invention.
Figure 3B:
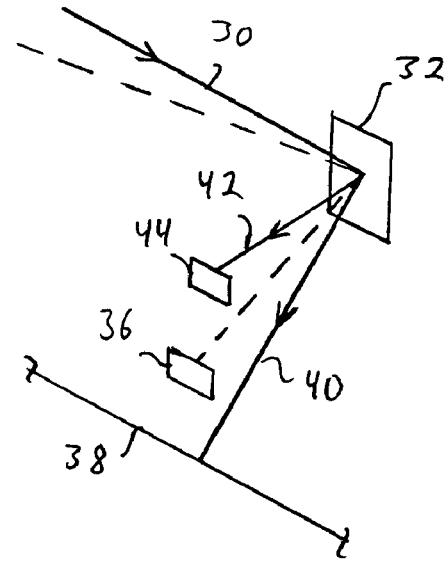

As shown in FIG. 3A, an imaging system in accordance with an embodiment of the invention involves directing an illumination field 30 toward an illumination modulator 32 along an off-axis direction such that the zero order reflected illumination field 34 is directed toward an energy absorbing block filter 36 when the modulator is not activated. In this case, no illumination should be directed toward the imaging surface 38 when the modulator is not activated. During imaging as shown in FIG. 3B, the +/- first order reflected fields 40 and 42 are directed toward the imaging surface 38 and another energy absorbing block filter 44 respectively. The first order reflected field 40 is directed toward the imaging surface 38 along a direction that is normal to the surface 38. Although the reflected field 42 is not used in imaging, reducing throughput efficiency, the system provides a high contrast ratio.

Figure 4A:
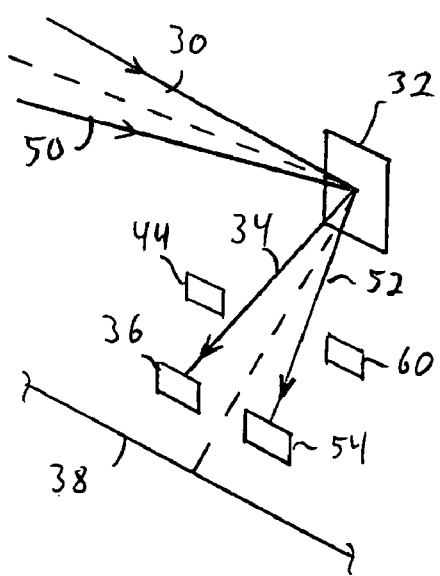
FIGS. 4A and 4B show illustrative diagrammatic views of an imaging system in accordance with another embodiment of the invention.
Figure 4B:
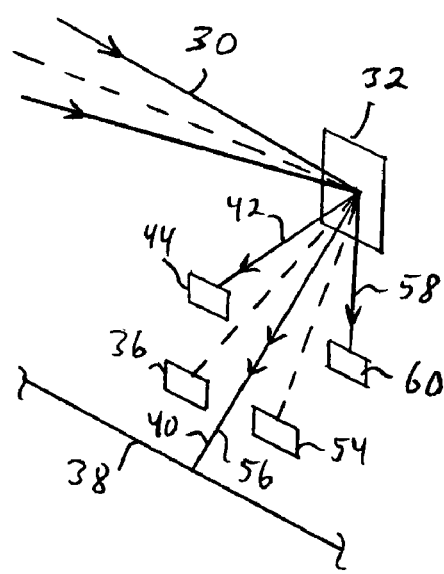

Another system of the invention may further include an additional illumination field 50 that is directed along an off-axis (e.g., a negative off-axis direction with respect to the field 30) toward the modulator 32 such that the zero order reflected illumination field 52 is directed toward an energy absorbing block filter 54 when the modulator is not activated as shown in FIG. 4A. Again, no illumination should be directed toward the imaging surface 38 when the modulator is not activated. During imaging as shown in FIG. 4B, the +/- first order reflected fields 56 and 58 are directed toward the imaging surface 38 and another energy absorbing block filter 60 respectively. The first order reflected field 56 is coincident with the first order reflected field 40 and both are directed toward the imaging surface 38 along a direction that is normal to the surface 38. The system of FIGS. 4A and 4B may employ two independent illumination sources or may employ optics for splitting the illumination field from one illumination source to provide the illumination fields 30 and 50. The modulator may have a plurality of modulator elements along a horizontal direction across the modulator to provide a two first order reflections as shown in FIG. 4A.

Figure 5A:
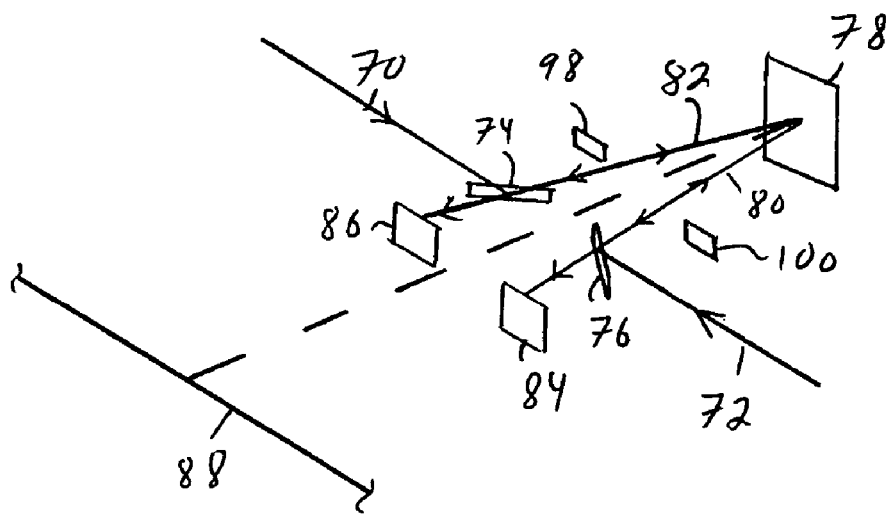
FIGS. 5A and 5B show illustrative diagrammatic views of an imaging system in accordance with a further embodiment of the invention.
Figure 5B:
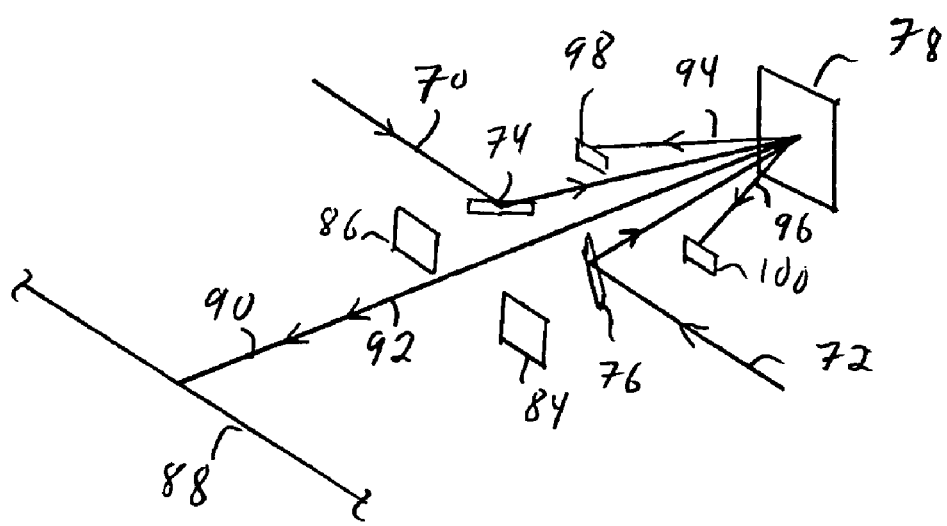

FIGS. 5A and 5B show a further system of the invention similar to the system of FIGS. 4A and 4B in which the incident and reflected signals are coplanar. The system involves directing illumination fields 70 and 72 via beam splitters 74 and 76 toward an illumination modulator 78 along off-axis directions such that the zero order reflected illumination fields 80 and 82 are directed toward energy absorbing block filters 84 and 86 when the modulator is not activated as shown in FIG. 5A. In this case, no illumination should be directed toward the imaging surface 88 when the modulator is not activated. During imaging as shown in FIG. 5B, the first order reflected fields 90 and 92 are directed toward the imaging surface 88 and the first order reflected fields 94 and 96 are directed toward energy absorbing block filters 98 and 100 respectively. The first order reflected fields 90 and 92 are coincident and are directed toward the imaging surface 88 along a direction that is normal to the surface 88. Again, although the reflected fields 94 and 96 are not used in imaging, the system provides a high contrast ratio. A benefit of using coplanar incident and reflected fields is that for illumination fields that are in the shape of a line, the coplanar system reduces any aberrations that may result in reflected fields when an incident field is directed toward the modulator from a high angle of incidence.

Figure 6:
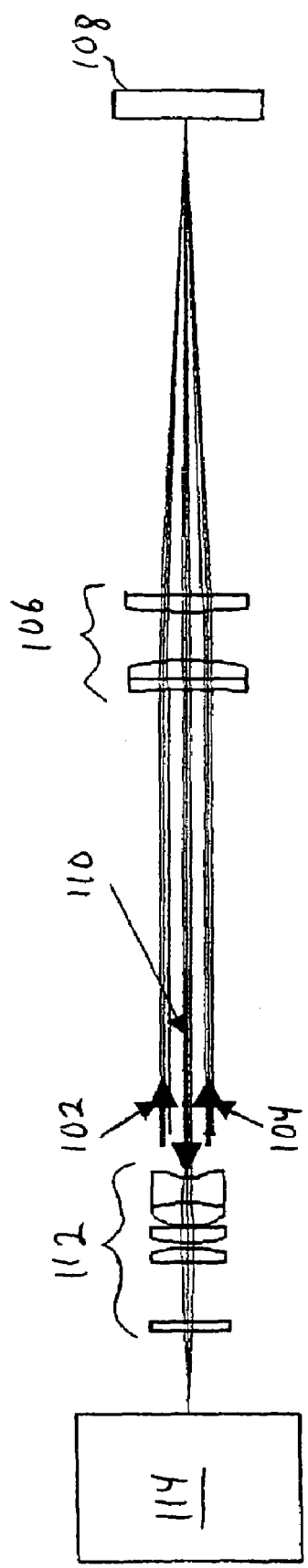
FIG. 6 shows an illustrative diagrammatic top view of an imaging system in accordance with another embodiment of the invention.

FIG. 6 shows an imaging system in which illumination fields 102 and 104 are directed via a field lens system 106 toward a GLV 108 having a grating spacing of, for example 8.5 μm. The illumination fields are each folded into collimated space at the GLV 108. During actuation, the first order reflected fields from the GLV 108 are directed coincident with one another as shown at 110 and are directed through imaging optics 112 onto the imaging surface of an imaging drum 114.

Figure 7A:
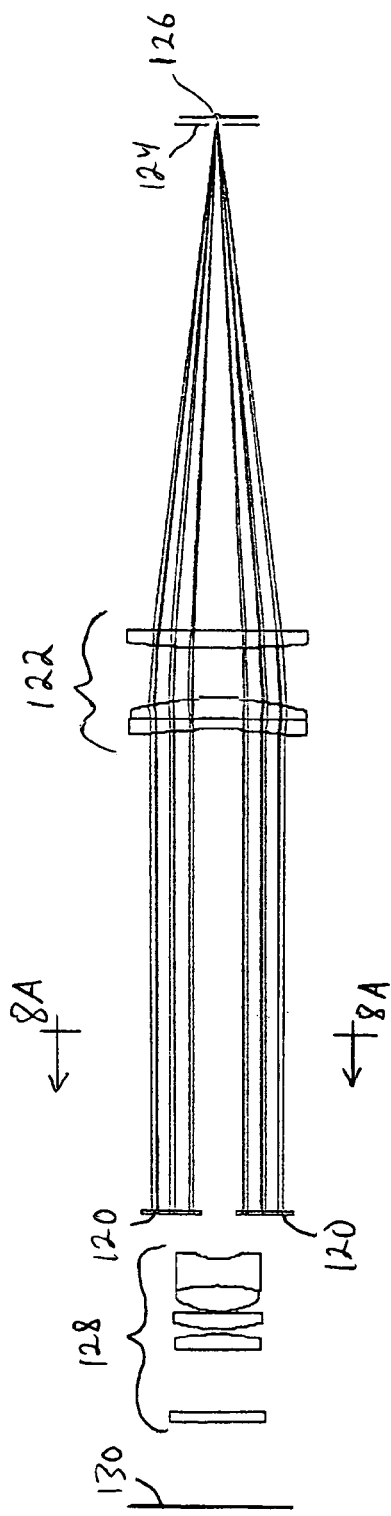
FIGS. 7A and 7B show illustrative diagrammatic top views of an imaging system in accordance with a further embodiment of the invention.
Figure 8A:
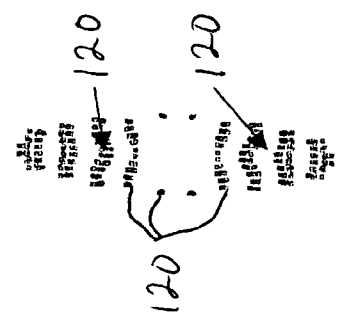
FIG. 8A shows an illustrative diagrammatic end view of a portion of the imaging system shown in FIG. 7A taken along line 8A—8A thereof.
Figure 7B:
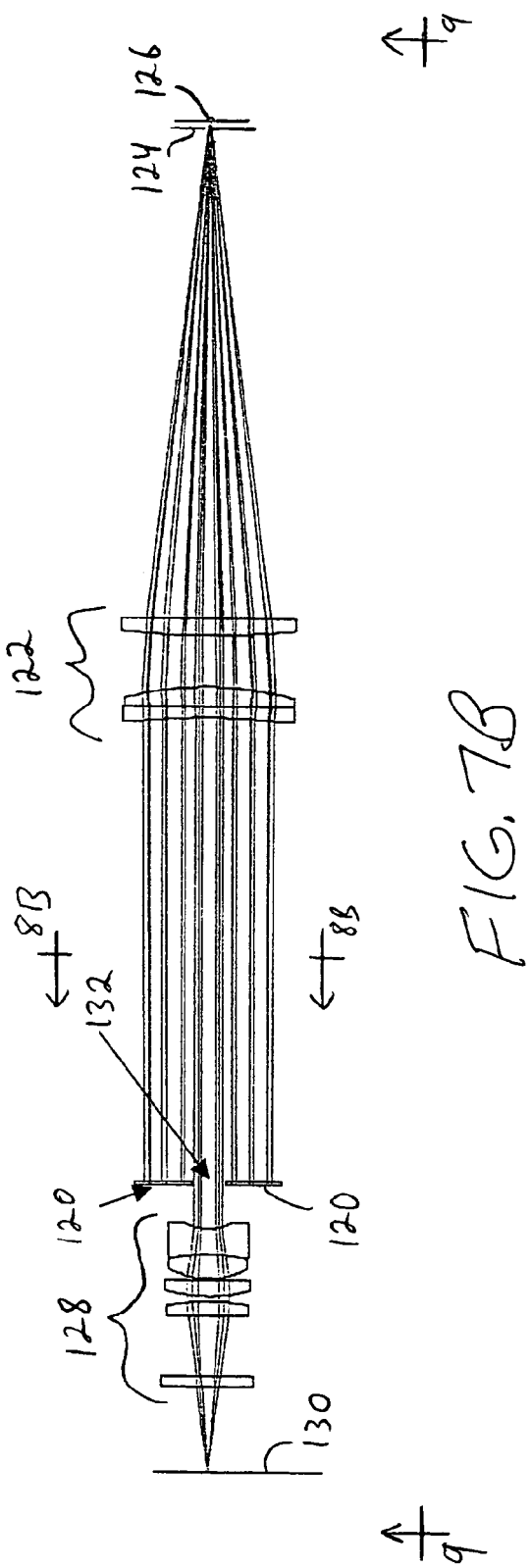
Figure 8B:
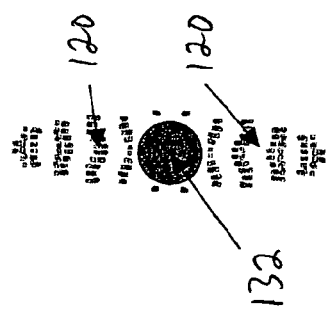
FIG. 8B shows an illustrative diagrammatic end view of a portion of the imaging system shown in FIG. 7B taken along line 8B—8B thereof.
Figure 9:
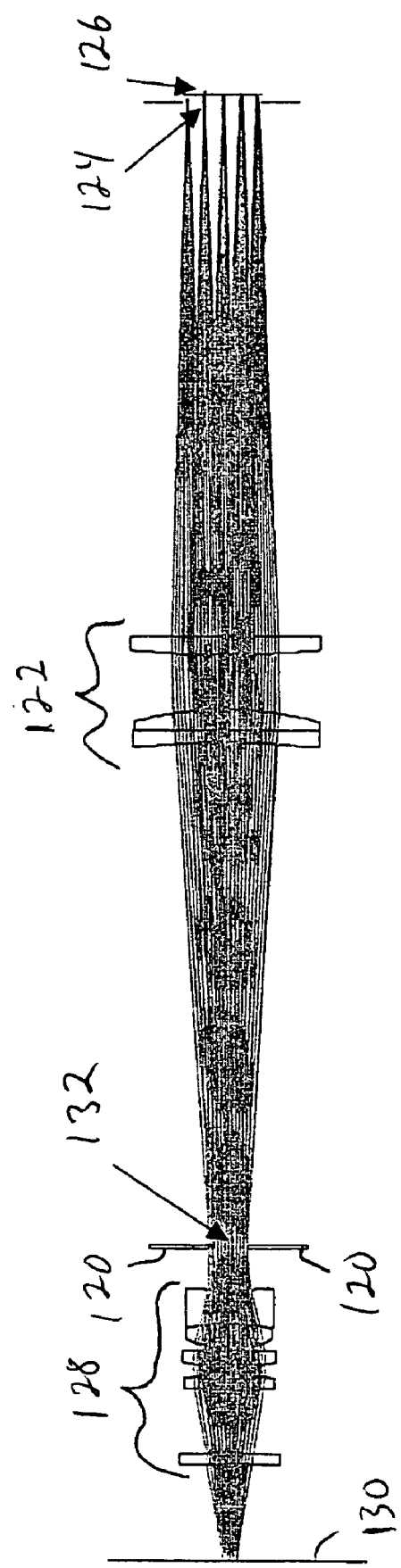
FIG. 9 shows an illustrative diagrammatic side view of the imaging system shown in FIG. 7B taken along line 9—9 thereof.

FIGS. 7A and 7B show an illumination system in accordance with a further embodiment of the invention in which the modulator is off in FIG. 7A and on in FIG. 7B. In particular, the illumination system includes a plurality of illumination sources 120 that direct illumination via optics 122 through a broad mask 124 onto a modulator 126. When the modulator is off, the reflected illumination is dispersed in many directions, but when the modulator is turned on, the reflected illumination is directed via imaging optics 128 onto a surface 130 of an imageable medium as shown in FIG. 7B. As shown in FIG. 8A, the system may include many illumination sources 120 that are positioned around the zero order direction (132). The system, in effect, floods the modulator with illumination, but reflects only the illumination along the zero order using the imaging optics 128 as shown in FIG. 8B. The illumination sources 120 may include one or more lens bars with a slow axis diffuser for single axis uniform angular diffusion. The illuminated line at the modulator may be broader than the active area and the mask without affecting the contrast ratio, although a loss of throughput may result. FIG. 9 shows a side view of the imaging system of FIG. 7B taken along line 9—9 in which the width of the imaging line on the modulator 126 and on the imaging surface 130 may be seen.

Those skilled in the art will appreciate that numerous modifications and variations may be made to the above disclosed embodiments without departing from the spirit and scope of the invention.

The invention claimed is:

1. An imaging system comprising a first off-axis illumination source for providing a first illumination field at a surface of an illumination modulator such that when said modulator is in a first non-activated mode a zero-order reflected illumination field is directed toward a first illumination blocking device, and when said modulator is in a second activated mode one first order reflected illumination field is directed toward an imaging surface while another first order reflected illumination field is directed toward a second illumination blocking device.

2. The imaging system as claimed in claim 1, wherein said system further includes a second off-axis illumination source for providing a second illumination field at a surface of said illumination modulator such that when said modulator is in said first non-activated mode a zero-order second reflected illumination field is directed toward a third illumination blocking device, and when said modulator is in said second activated mode a first order second reflected illumination field is directed toward said imaging surface.

3. The imaging system as claimed in claim 2, wherein said first and second off-axis illumination fields are produced by a common illumination source.

4. The imaging system as claimed in claim 2, wherein said one first order reflected illumination field is coincident with said one first order second reflected illumination field.

5. The imaging system as claimed in claim 1, wherein said one first order reflected illumination field is directed toward the imaging surface along a direction that is normal to said modulator.

6. The imaging system as claimed in claim 1, wherein said modulator reflects illumination along a direction of said one first order reflected illumination field only when said modulator is in said activated second mode.

7. The imaging system of claim 1 wherein the off-axis illumination source provides the first illumination field at the surface of the illumination modulator from a first direction, said illumination modulator includes modulator elements mutually spaced apart from one another along a second direction, and said first direction is non-orthogonal to said second direction.

8. The imaging system as claimed in claim 7, wherein said zero-order reflected illumination field, said one first order reflected illumination field and said another first order reflected illumination field generally define a single plane, and said first direction lies outside said plane.

9. The imaging system as claimed in claim 7, wherein said zero-order reflected illumination field, said one first order reflected illumination field and said another first order reflected illumination field generally define a single plane, and said first direction lies within said plane.

* * * * *